United States Patent
Pouchak et al.

(10) Patent No.: US 12,398,902 B2
(45) Date of Patent: Aug. 26, 2025

(54) CONTROL SYSTEM

(71) Applicant: Honeywell International Inc., Charlotte, NC (US)

(72) Inventors: Michael A. Pouchak, St. Anthony, MN (US); Ravi Bharathi Krishnan, Bangalore (IN); Paul Wacker, Plymouth, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 180 days.

(21) Appl. No.: 18/095,317

(22) Filed: Jan. 10, 2023

(65) Prior Publication Data
US 2023/0160592 A1 May 25, 2023

Related U.S. Application Data

(63) Continuation of application No. 16/892,934, filed on Jun. 4, 2020, now Pat. No. 11,566,808.
(Continued)

(51) Int. Cl.
*H04L 67/125* (2022.01)
*F24F 11/58* (2018.01)
(Continued)

(52) U.S. Cl.
CPC .............. *F24F 11/58* (2018.01); *G05B 15/02* (2013.01); *G06F 21/575* (2013.01);
(Continued)

(58) Field of Classification Search
CPC ............... H04L 12/4641; H04L 67/125; H04L 63/0272; H04L 12/10; H04L 61/5014;
(Continued)

(56) References Cited

U.S. PATENT DOCUMENTS 7,653,459 B2  1/2010  Pouchak et al.
7,738,972 B2  6/2010  Pouchak
(Continued)

FOREIGN PATENT DOCUMENTS

CN  101354581 B  3/2011
CN  107003654 A  8/2017

OTHER PUBLICATIONS

Parmar, "Addressing IP Security Concerns when Deploying a BACnet System," AHR Expo, Chicago, 40 pages, Jan. 22-24, 2018.
(Continued)

*Primary Examiner* — Jungwon Chang
(74) *Attorney, Agent, or Firm* — Seager, Tufte & Wickhem, LLP

(57) ABSTRACT

A powerful direct digital control (DDC) and integration control platform that is scalable and easy to use and meet building owners and contractors' desires for a highly secure and robust technical solution. One may combine heating, ventilation and air conditioning (HVAC) DDC control with the embedded workstation platform, and DDC controllers with embedded workstation platform software design. An embedded workstation platform event-driven approach (such as a Windows operating system (OS) or Unix OS environment) is not necessarily easily suited to real-time common in HVAC DDC control. The present system may solve an issue of combining high-power event needs for HVAC DDC Controls.

17 Claims, 6 Drawing Sheets

Related U.S. Application Data

(60) Provisional application No. 62/859,583, filed on Jun. 10, 2019.

(51) Int. Cl.
    *G05B 15/02* (2006.01)
    *G06F 21/57* (2013.01)
    *G06F 21/62* (2013.01)
    *H04L 12/46* (2006.01)

(52) U.S. Cl.
    CPC ...... *G06F 21/6218* (2013.01); *H04L 12/4641* (2013.01); *H04L 67/125* (2013.01)

(58) Field of Classification Search
    CPC ...... F24F 11/58; G05B 15/02; G06F 21/6218; G06F 21/575
    USPC .......................................... 709/219
    See application file for complete search history.

(56) References Cited

U.S. PATENT DOCUMENTS

| | | | |
|---|---|---|---|
| 7,826,929 B2 | 11/2010 | Wacker | |
| 8,112,162 B2 | 2/2012 | Pouchak et al. | |
| 8,239,500 B2 | 8/2012 | Pouchak | |
| 8,375,402 B2 | 2/2013 | Majewski et al. | |
| 8,418,128 B2 | 4/2013 | Pouchak et al. | |
| 8,650,306 B2 | 2/2014 | Pouchak | |
| 8,954,543 B2 | 2/2015 | Pouchak | |
| 8,963,632 B2 | 2/2015 | Schenk | |
| 9,726,392 B2 | 8/2017 | Wacker | |
| 10,200,203 B2 | 2/2019 | Jones et al. | |
| 10,753,630 B2 | 8/2020 | Rupp et al. | |
| 11,108,649 B2 | 8/2021 | Pouchak et al. | |
| 11,162,702 B2 | 11/2021 | Blair et al. | |
| 11,237,528 B2 | 2/2022 | Gerszewski et al. | |
| 2006/0106499 A1* | 5/2006 | Roosli .................... | G05B 9/02 700/276 |
| 2015/0212714 A1* | 7/2015 | Hua ...................... | G05B 19/409 715/739 |
| 2016/0020910 A1* | 1/2016 | Jones .................... | H04L 12/10 370/218 |
| 2016/0091903 A1* | 3/2016 | Patton ................ | G05D 23/1927 700/300 |
| 2017/0315522 A1* | 11/2017 | Kwon .................... | G05B 17/02 |
| 2018/0167229 A1* | 6/2018 | Brun .................... | G06F 11/3048 |
| 2020/0076694 A1* | 3/2020 | Drury ................ | H04L 61/5014 |

OTHER PUBLICATIONS

European Search Report for Application No. 20179390.8-1218 mailed Oct. 28, 2020.

First Office Action, Chinese Patent Office, CN Application No. 202010527034.1, Apr. 9, 2024 (10 pages in Chinese; 7 pages in English).

First Office Action, Chinese Patent Office, CN Application No. 202010527034.1, Aug. 23, 2024 (8 pages in Chinese; 9 pages in English).

Li, L., et al., "10Mb, 100Mb, 1000Mb Ethernet and Networking Schemes thereof," Daheng Electronic Publish House, May 2000.

\* cited by examiner

CONTROL SYSTEM

This application is a continuation of U.S. patent application Ser. No. 16/892,934, filed Jun. 4, 2020, which claims the benefit of U.S. Provisional Patent Application No. 62/859,583, filed Jun. 10, 2019. U.S. Provisional Patent Application No. 62/859,583, filed Jun. 10, 2019, is hereby incorporated by reference. U.S. patent application Ser. No. 16/892,934, filed Jun. 4, 2020, is hereby incorporated by reference.

BACKGROUND

The present disclosure pertains to controls and platforms.

SUMMARY

The disclosure reveals a powerful direct digital control (DDC) and integration control platform that is scalable and easy to use and meet building owners and contractors' desires for a highly secure and robust technical solution. One may combine heating, ventilation and air conditioning (HVAC) DDC control with the embedded workstation platform, and DDC controllers with embedded workstation platform software design. An embedded workstation platform event-driven approach (such as a Windows operating system (OS) or Unix OS environment) is not necessarily easily suited to real-time common in HVAC DDC control. The present system may solve an issue of combining high-power event needs for HVAC DDC Controls.

DESCRIPTION

Figure 1:
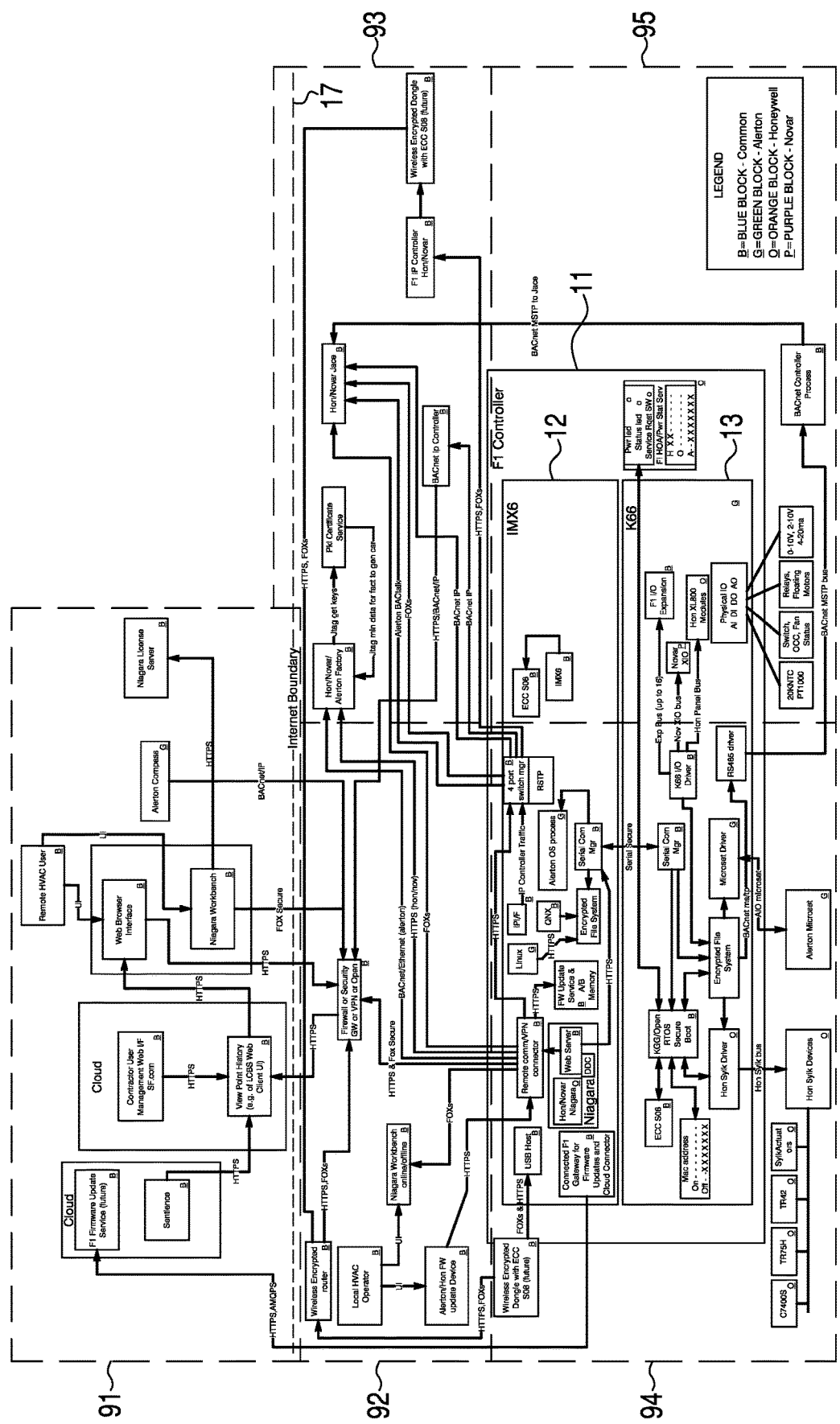
FIG. 1 is a diagram of the present system and approach.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

A powerful direct digital control (DDC) and integration control platform that is scalable and easy to use and meet building owners and contractors' desires seems to be needed for a highly secure and robust technical solution. One may combine heating, ventilation and air conditioning (HVAC) DDC control with the embedded workstation platform, and DDC controllers with embedded workstation platform software design. An embedded workstation platform event-driven approach (such as a Windows operating system (OS) or Unix OS environment) is not necessarily easily suited to real-time common in HVAC DDC control. The present system may solve an issue of combining high-power event needs for HVAC DDC Controls.

A present controller (e.g., Honeywell CIPer™ 30) may combine benefits of a high speed commercial information technology (IT) infrastructure, friendly internet protocol (IP) networks with the robust and highly autonomous individual zone control (e.g., Honeywell Spyder™ controller) with the great power and advantages of a Niagara™ integration platform. Cybersecurity may be built in from the ground floor and support scalable and high level security, including secure socket layer (SSL) encrypted communications and Fox security (FOXs) protocol between controllers. The current standard in building automation for BACnet™ IP and Lonworks™ does not necessarily appear to support this level of security.

A Honeywell CIPer™ Model 30 Controller may be scalable, fast and flexible to handle a range of devices. It may be industry's only Niagara-based controller with at least a one 1 GBPS, multi or four port switch. It may be BACnet B-BC listed to support a wide range of applications. It may connect with IP peripheral devices at speeds up to 10 times faster than using "Fast Ethernet" and 1,000 times faster than MS/TP controllers.

The CIPer controller, the Spyder controller or a Honeywell function block engine may be used in the present system as a controller 11. Controller 11 may be referred to as an F1 controller.

A Java application control engine (JACE™) is a mechanism or device that may provide connectivity to systems (e.g., HVAC, electrical, even security in some cases) within a building via the Niagara framework. By connecting common network protocols such as LonWorks, BACnet, and Modbus™, along with many other networks, a unified system without seams may result. JACE may be a compact, embedded internet of things (IoT) controller and server platform for connecting multiple and diverse devices and sub-systems The present system may be a collection of subsystems that are composed of key components. There may be an overall system performance that is easy to use, and represents a significant increase in performance and power over the related art. Some of the individual components that contribute to the system may include: a high speed built in 4-port switch with 1 giga-bit per second (Gbps) performance; an overall system cost being about ¼ of a cost of a combination controller and supervisor, separately; an open protocol Niagara N4 wire sheet; alarming, history, schedules, web server, and tagging; a built in IO of 3 UI/AI, 3 UI/AO, 6 DO with expansion modules modular enhancement up to about 300 points total; an industry standard Niagara framework for reduced training; standard integration drivers, and open system solutions; built in analytics for preventative maintenance and predictive failure analysis; built in SSL encrypted communication and Federal information processing standard (FIPS) 140-2 level 1 compliance; easy communication between CIPer and a supervisor without expensive external components; a rapid spanning tree protocol (RSTP) that allows a ring architecture of up to forty controllers; a BACnet building controller (BBC); and standard workstation support for an industry standard interface. The present system may be built on other subsystems but represents a new platform in terms of overall layout, performance and cost.

Approaches may be introduced within the Niagara framework to allow for a subset of logic that is executed and associated with non-determinism may be handled, along with monitoring of the determinism quality, and properties and attain the desired performance. This may include a container with an approach to launch a subset of control logic blocks that may be executed in a defined manner of the performance.

An architecture diagram may be referred to in FIG. 1. Implementation details may incorporate the following items. 1) Function block executions may be sequenced; 2) Users may change the block sequence and control the order of execution; 3) Execution engine priority may be adjusted to ensure that the engine gets higher priority; 4) Engine logic may mark the starting millisecond in a second when the engine starts and executions begin (for example, if the engine starts at 20 ms of a second, next iteration may also be started at 0020, 1020, 2020, 3020, . . . N020 seconds); 5) Mechanisms may be put in place to detect deviations in the execution; 6) Mechanisms may be put in place to trend the execution time cycle for rectification in case of a deviation; and 7) Options may be available for the users to report out any misses in the execution cycle or anything else.

There may be a rapid control system prototyping solution with real time feedback. Buildings may consume a vast amount of the total energy consumed in the U.S. A significant portion of the energy consumed in buildings may be wasted because of the lack of controls or the inability to use existing building automation systems (BAS's) properly. Much of the waste may occur because of an inability to manage and control buildings efficiently. Many of these buildings currently do not use BAS's to monitor and control their energy systems from a central location. Buildings that use BAS's are typically large.

In general, the application of and control of custom DDC application programs depend on easy to use programming languages and reuse of libraries. In the past, frameworks such as Niagara combined with application programming environments have been successful due to the integration between the "function block" or block input/output graphical programming language and the application of controls in a real-time embedded controller. In the past, it appears to have been disruptive and time consuming to complete virtually all the processes of design from the start of the control strategy, to implementation, and to downloading. Often in advanced applications, there may be a large amount of iteration, and the cycle time of the iteration may be critical to success. It appears essential to solve the issue of a fast and reliable design using web architecture combined with quick downloads and quick feedback for the actual results of a control strategy.

The present system appears different from the related art due to a unique and efficient use of the compiled graphical programming image and its implementation in the event-driven Niagara framework. Past implementations of a web function block language were limited to a downloaded image that was first compiled graphically, and converted to an efficient storage mechanism that required sophisticated storage file sections in real-time file structures A complicated and non-volatile storage mechanism in the real time DDC controller needed a sophisticated segmentation of data and object information including a function block configuration, parameters, a Sylk™ configuration, network variables, BACnet and a Lon™ interface configuration, and other control network information parameters. The present approach appears significantly faster, and allows near instantaneous feedback of results. In addition, techniques have been implemented to take advantage of the IP network and allow powerful integration with a Niagara workbench.

The present system may be a result of segmenting the Niagara wire sheet in a system on module (Som) board and allowing all the configuration and actual implementation of the running real-time function block engine in the Som board under Niagara to communicate to the baseboard with some architectural extensions for high speed communications as noted in the following: 1) Configuration of the function blocks are maintained in the Niagara environment in XML and run directly on a Niagara event driven environment; 2) The Niagara event driven environment may have special modifications made that allow the function block engine and overall DDC performance to be maintained in a pseudo deterministic environment, allowing the power of the Niagara event-driven engine to be combined with a highly deterministic function block engine DDC dedicated controller with analog/digital (A/D) and IO performance; 3) The baseboard subsystem may be implemented in a highly efficient protocol that allows direct access to local subsystems such as Sylk, DO/AO/AI physical IO assignments and extension IO subsystems; 4) The baseboard subsystem may be implemented with a unique error message passing mechanism to help identify subsystem configuration issues without using slower configuration error data structures; 5). The baseboard subsystem may be implemented using a high speed serial port communicating to extremely low latency RAM/flash configuration approach that reduces many of the delays, file download times, and overhead; 6) Overall performance for configuration may be nearly instantaneous to the user, allowing near real time performance and no disruption to the design and trouble-shooting process; and 7) The normally separate action of enabling debugging may be eliminated due to the actual performance and IO feedback being given in the pseudo real-time Niagara wire sheet.

A sensor in the present system may be hardware device with some embedded software measuring/detecting & transmitting data (e.g., temperature, pressure, motion) software type. As embedded, software may run in a device/unit (firmware). Software may be incidental to the present controller, which may be deployed using software, or manually (without the software).

Figure 2A:
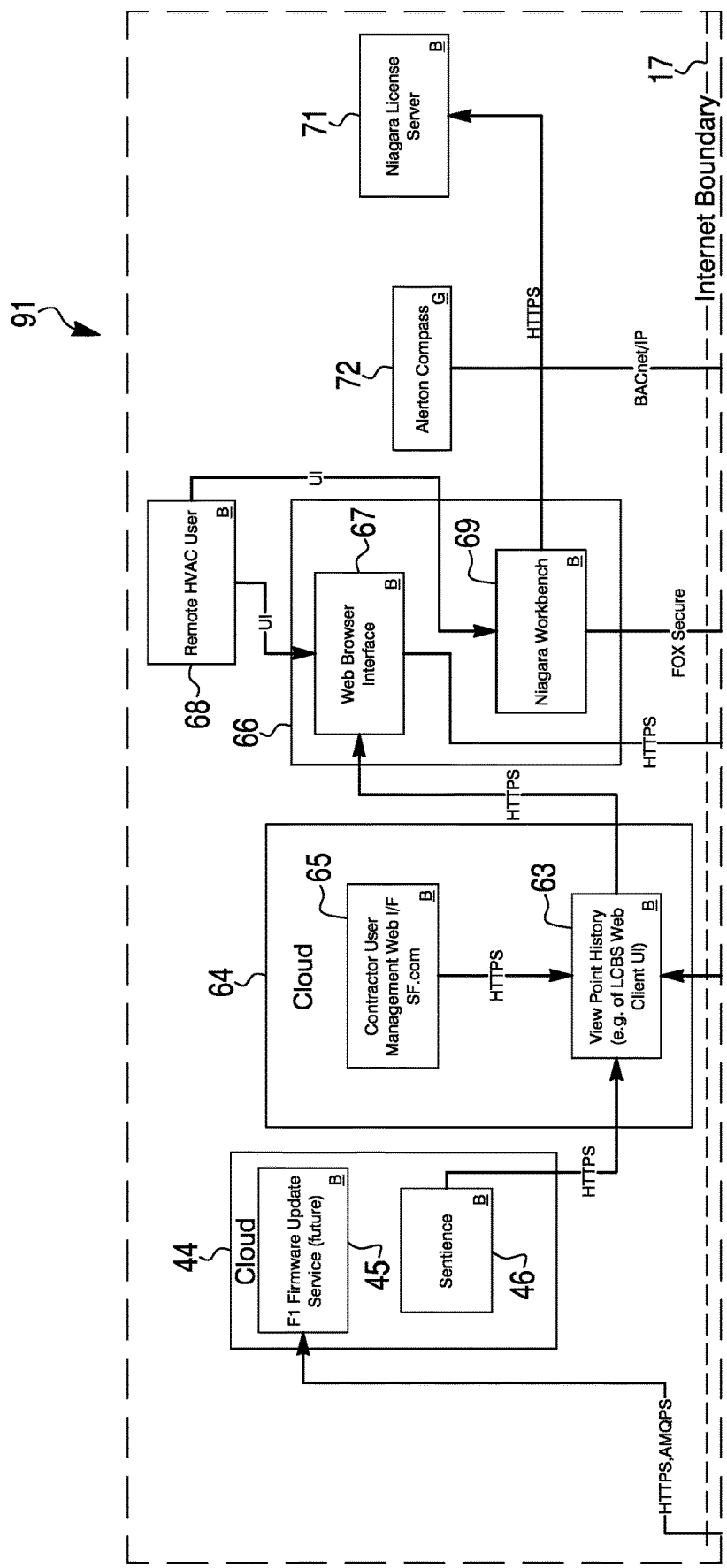
FIGS. 2A, 2B, 2C, 2D and 2E are diagrams of enlarged portions from FIG. 1.

FIG. 1 is a diagram of a summary view of a controller 11 and associated components. FIGS. 2A, 2B, 2C, 2D and 2E show portions 91, 92, 93, 94 and 95, respectfully of FIG. 1. In FIGS. 2D and 2E show portions 94 and 95, respectfully, revealing that controller 11 may have a card or board 12 and a card or board 13. There may be just one board or more than two boards. For illustrative purposes, there may be two boards. Card 12 may have a 4-port switch 14 having a speed of one or more Gbps. Switch 14 may have a hypertext transfer protocol secure (HTTPS) input from a remote comm/virtual private network (VPN) connector 15. Connector 15 may also have an input of IP controller traffic from IP interface (I/F) 16. Two other ports of switch may be connected outside of controller 11 and across an internet boundary 17. Remote comm/VPN 15 may have connections outside of controller 11.

A Niagara component 18 on board 12 may have a web server 19 and component 21 connected to remote comm/VPN connector 15. A function block engine may be situated in component 21 and have a direct digital control connection to remote comm/VPN connector 15. An HTTPS connection from remote comm/VPN connector 15 may go to a firmware (FW) update service and A/B memory.

An IMX6 23 may be connected to an elliptic curve cryptography (ECC) 508 24. These components may be substituted with similar components from different makers. A serial communication mgr 25 may be connected to an operating system (OS) processor 26 and to an encrypted file system 27. An ONX 28 and a Linux 29 may be connected to encrypted file system 27.

Serial com mgr 25 of board 12 may have a connection to a serial com mgr 31 of board 13. There is serial security between components 25 and 31 via a high speed (e.g., greater than one Gbps) channel 85 connecting components 25 and 31. Data that are static and moving between components may be encrypted.

Serial com mgr 31 may be connected to an encrypted file system 32. An IO driver 33 may be connected to encrypted file system 32. Driver 33 may provide an expansion bus (up to 16) to controller IO expansion component 34, and signals to X10 bus 35 and panel bus signals to a company's XL800 modules 36. BACnet master-slave/token-passing (MSTP) signals may go from encrypted file system 32 to an RS 485 driver 37. Signals may go from encrypted file system 32 to a microset driver 38. Signals may also go from encrypted file system 32 to Sylk™ driver 39. An open real-time operating system (RTOS)-secure boot 41 may provide signals to encrypted file system 32 and to ECC 508 42. Mac address information from boot 41 may be provided to block 88.

A physical IO 81 may be associated with modules 36 and provide AI, DI, DO and AO terminals, which may be connected to a variety of devices 82, for example, "20KNTC PT1000", "Switch, OCC, Fan Status", "Relays, Floating Motors", and "0-10V, 2-10V, 4-20 ma", respectively.

A hand-off-auto (HOA) board 84 may be connected to open RTOS-secure boot 41. One part of board 84 may reveal Power, Status and Service Request SW, with LED's. Another part of board 84 may reveal HOA control, and hand-off-auto switches. An H selection may enable an output to the web server, an 0 selection may disable an output to the web server, and an A selection may provide an automatic signal to the web server. With an A selection, the function block engine may be activated to output a signal or calculation command as directed by the automatic signal.

A connected controller 11 gateway 43 for firmware updates and a cloud connector, may provide HTTFS, advanced message queuing protocol signals (AMQPS) across internet boundary 17 to a controller 11 firmware update service component 45 of a cloud 44.

A USB host 47 may have a FOXs & HTTPS connection to a wireless encrypted dongle 48 with ECC 508. An HTTPS, FOXs connection may go from dongle 48 to a wireless encrypted router 49. A connection may go from a PW update device 51 to remote comm/VPN connector 15. A local HVAC operator station 52 may have a UI connection to FW update device 51 and a UI connection to a Niagara workbench 53 online/offline. A FOXs connection may go from remote comm/VPN connector 15 to Niagara workbench 53.

Figure 2B:
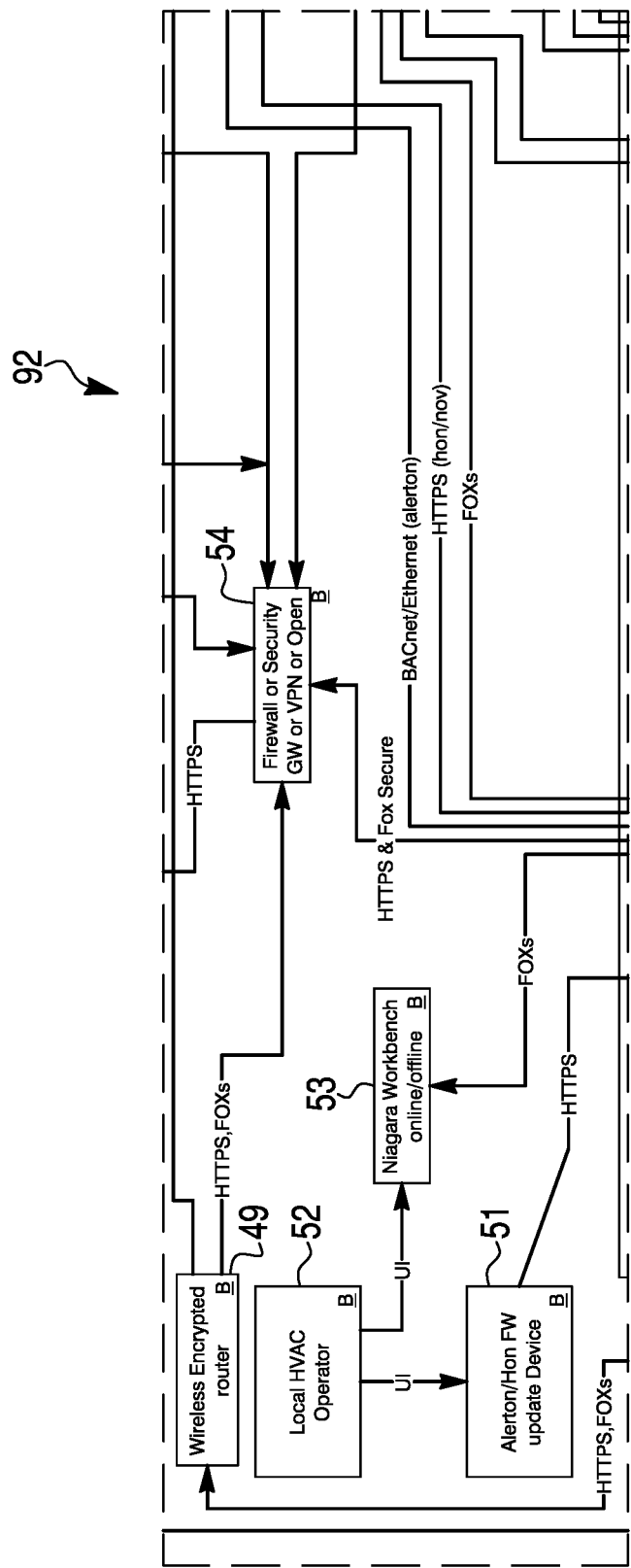

An HTTPS, FOXs may go from wireless encrypted router 49 to a firewall or security GW or VPN or open mechanism 54 shown in portion 92 of FIG. 2B. An HTTPS & FOX secure connection may go from remote comm/VPN connector 15 to mechanism 54 in portion 92 of FIG. 2B. A BACnet/Ethernet connection may go from remote comm/VPN connector 15 to factory 55. An HTTPS connection may go from remote comm/VPN connector 15 to factory 55.

Power over Ethernet (PoE) is a technology for wired Ethernet local area networks (LANs) that may allow the electrical current necessary for the operation of each device to be carried by the data cables rather than by power cords. This technology may be useful in expansion or chain connections of components such as subsystems, systems, controllers, and so forth.

Figure 2C:
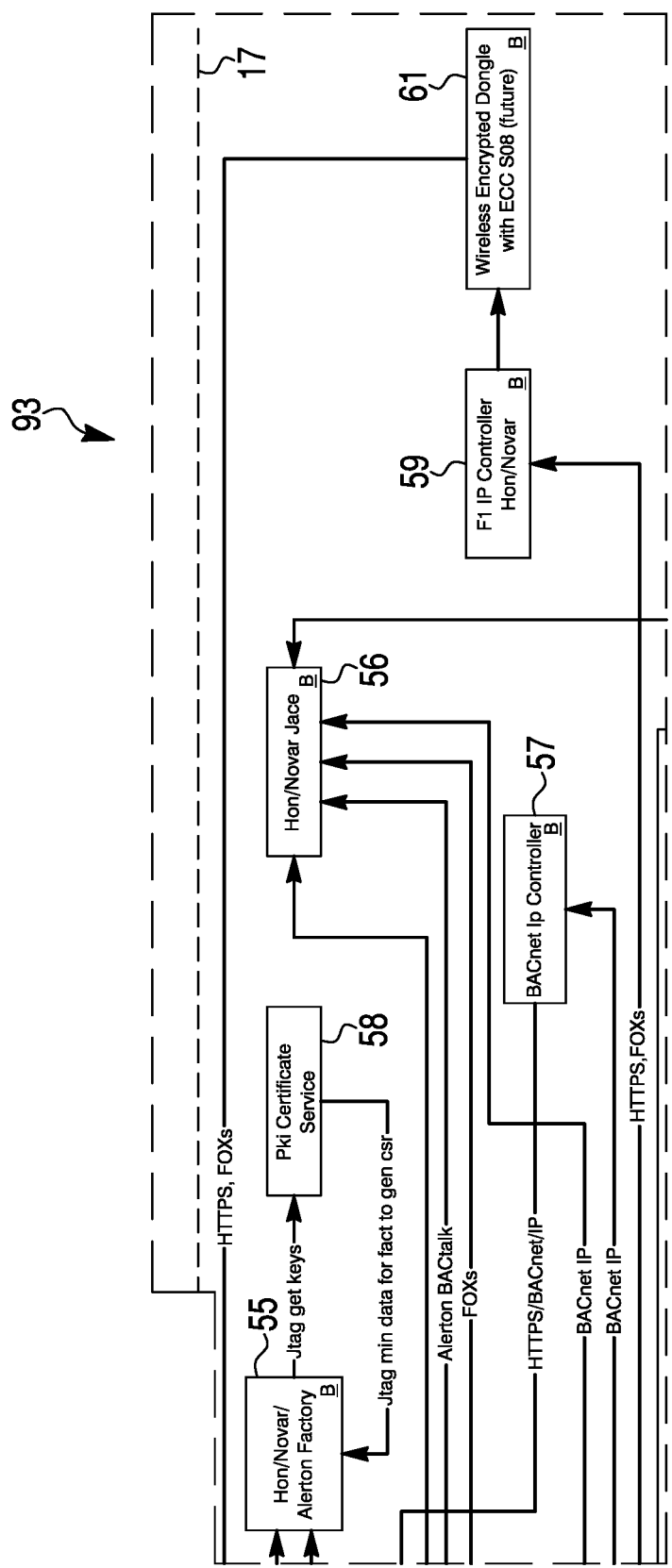
Figure 2D:
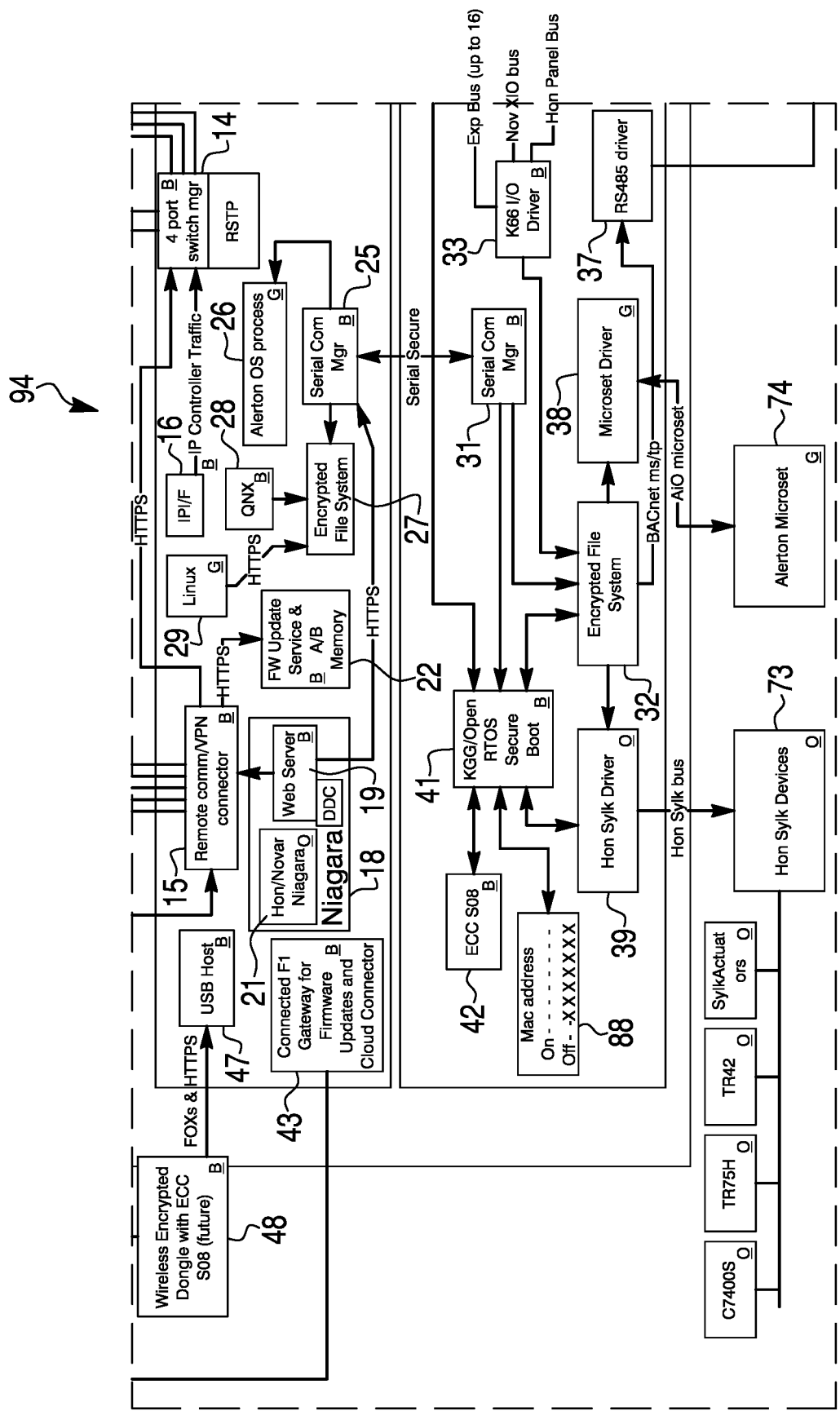
Figure 2E:
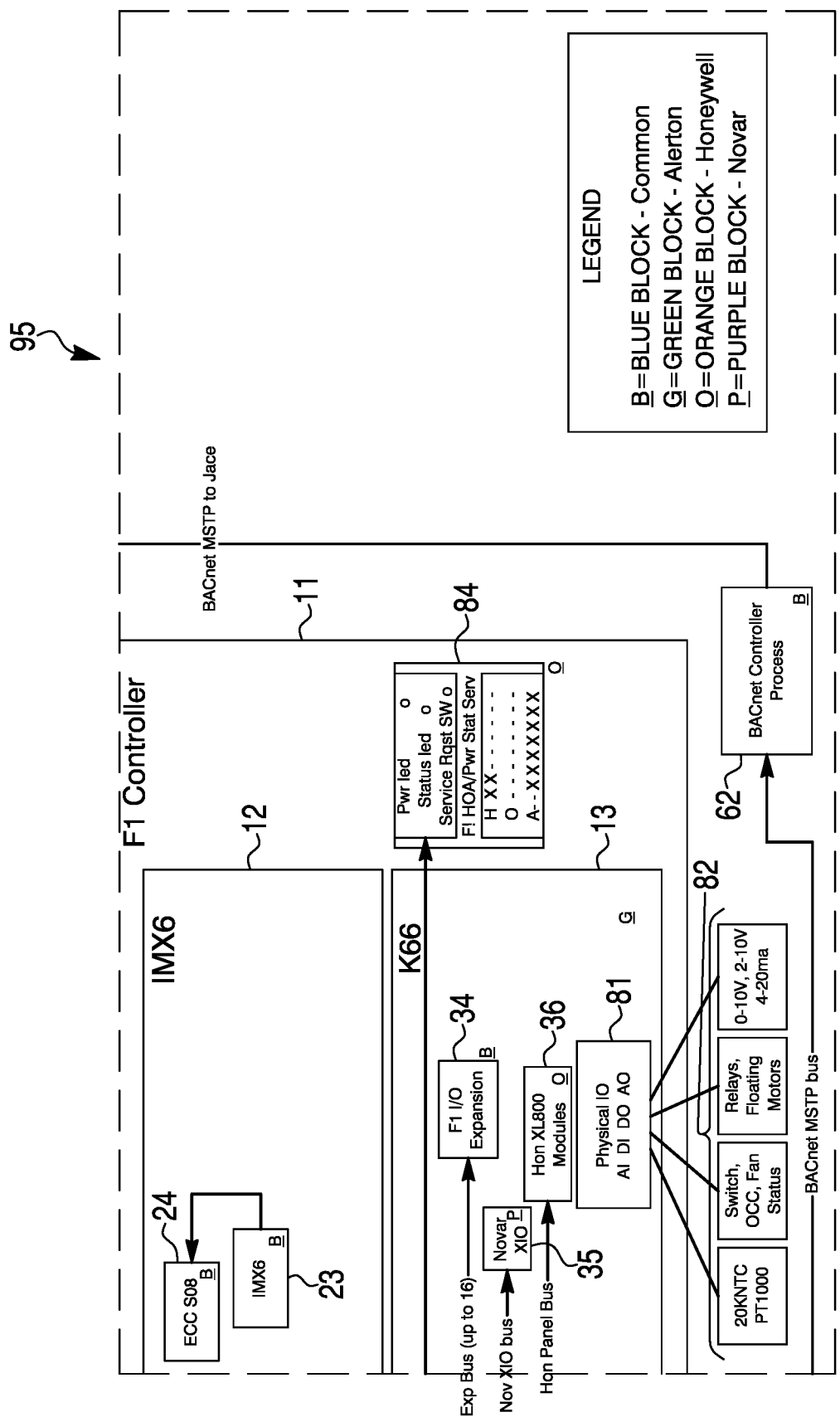

A FOXs connection may go from remote comm/VPN connector 15 to a JACE 56 as shown in portion 93 of FIG. 2C. A BACnet connection may go from four-port switch mgr 14 to JACE 56. A FOXs connection may go from switch 14 to JACE 56. A BACnet IP connection may go from switch 14 to JACE 56. A BACnet IP connection may go from switch 14 to a BACnet to controller device 57. An HTTPS/BACnet/IP connection may go from device 57 to mechanism 54. A "joint test action group (jtag) get Keys" connection may go from factory 55 to a public key infrastructure (Pki) certificate service module 58. A "jtag min data for fact to gen certificate signing request (csr)" connection may go from Pki service module 58 to factory 55. An HTTPS FOXs connection may go from switch 14 to controller 11 box 59. A connection may go from box 59 to a wireless encrypted dongle 61, with ECC 508. An HTTPS, FOXs connection may go from wireless encrypted router 49 to wireless encrypted dongle 61.

A BACnet MSTP bus connection may go from driver 37 to a BACnet controller process module 62 in portion 95 of FIG. 2E. A BACnet MSTP to JACE connection may go from module 62 to JACE 56.

A connection HTTPS may go from a sentinence 46 of cloud 44 to a view point history module 63 (e.g., of light commercial building solutions (LCBS) web client UI) in portion 91 of FIG. 2A. An HTTPS connection may go from a contractor user management web I/F SF.COM module 65 of a cloud 64 to module 63. An HTTPS connection may go from mechanism 54 to module 63. An HTTPS connection may go from module 63 to a web browser interface 67 of a module 66. A remote HVAC user device 68 may have a UI connection to web browser 67 and a UI connection to a Niagara workbench 69 of module 66. An HTTPS connection may go from web browser interface 67 to mechanism 54. An HTTPS connection may go from Niagara workbench 69 to a Niagara license server 71. A FOX Secure connection may go from workbench 69 to mechanism 54. A compass 72 may have a BACnet/IP connection to mechanism 54.

Sylk driver 39 may have a Sylk bus connection to Sylk devices 73, such as, for example, modules C7400S, TR75H, TR42, and actuators. Microset driver 38 may have an all in one (AIO) microset connection to a microset 74 set of devices.

To recap, a control system may incorporate an off-premise internet cloud and tool subsystem, an on-premise networking infrastructure and control subsystem, an internet protocol controller subsystem, an external bus device subsystem, and an input/output (TO) device subsystem. The internet protocol controller subsystem may relate to or be a specialty apparatus for one or more buildings such as, for example, a heating, ventilation, and air conditioning (HVAC) controller.

The external bus device subsystem may incorporate a local IO device communication subsystem.

The IO device subsystem may incorporate expansion IO devices and physical IO devices.

The off-premise internet cloud and tool subsystem may incorporate a Niagara™ license server connected to a Niagara workbench, a web browser interface connected to a firewall or security or virtual private network (VPN) or open module, and a remote HVAC user mechanism for operating the web browser interface or the Niagara workbench.

The on-premise networking infrastructure and control subsystem may incorporate a firewall or security or VPN or open module having a secure connection to a Niagara workbench, and a wireless encrypted router connected to the firewall or security or VPN or open module and connected to a wireless encrypted dongle, and a BACnet internet protocol (IP) controller connected to the firewall or security or VPN or open module.

The internal protocol controller subsystem may incorporate a remote communication VPN connector connected to a Niagara workbench online/offline, the firewall or security or VPN or open module, a factory and a Java™ application control engine (JACE™), a firmware (FW) updated service, a memory, and a multi or four port switch manager. The multi or four port switch manager may be connected to the JACE, a BACnet IP controller, an F1 IP controller, and/or a similar or equivalent controller, and the factory may be connected to a public key infrastructure (PKI) certificate service.

An approach for constructing a secure control system, may incorporate interconnecting an off-premise internet cloud and tool subsystem across an internet boundary with an on-premise networking infrastructure and control subsystem via one or more secure and non-secure connections, interconnecting the on-premise networking infrastructure and control subsystem with an internet protocol controller subsystem via one or more secure and non-secure connections, interconnecting the internet protocol controller subsystem with an external bus device subsystem via one or more secure and non-secure connections, and interconnecting the external bus device subsystem with an IO device subsystem.

The internet protocol controller subsystem may incorporate a direct digital control module connected to a web server and a processing platform. The web server may be connected to a remote communication virtual private network (VPN) connector and a first serial communication manager module.

The first serial communication manager module may be connected to a second serial communication manager via a secure connection.

The remote communication VPN connector may be connected to components of the on-premise networking infrastructure and control subsystem.

The remote communication VPN connector may be connected to a multi or four port switch manager of the internet protocol controller subsystem, and a firmware (FW) update service and a memory.

The four port switch may be connected via one or more secure and non-secure connections to a Java™ application control engine (JACE) module and to one or more internet protocol controller subsystem of the on-premise networking infrastructure and control subsystem.

At least one of the one or more internet protocol controller subsystems may be connected to a firewall or security or VPN or open module. The firewall or security or VPN or open module may be connected via one or more secure and non-secure connections to a cloud of the off-premise internet cloud and tool subsystem.

An apparatus for a secure direct digital control and integration control platform may incorporate an internet protocol controller subsystem having a direct digital control module, a web server, and a workstation platform operating subsystem interconnected with one another. The web server may be connected to a remote communication virtual private network (VPN) connector and to a first serial communication manager that is connected to an encrypted file system and has a secure connection to a second serial communication manager.

The apparatus may further incorporate an on-premise networking infrastructure and control subsystem having an online/offline workbench, a firewall or security or VPN or open module, a factory module and a Java™ application control engine (JACE) module connected via a secure or non-secure line to the remote communication VPN connector of the internet protocol controller subsystem.

The apparatus may further incorporate an off-premise internet cloud and tool subsystem having a cloud, a workbench and a web browser interface connected to the firewall or security or VPN or open module of the on-premise networking infrastructure and control subsystem. A remote heating, ventilation and air conditioning (HVAC) user interface may be connected to the web browser interface and the workbench.

The remote communication VPN connector of the internet protocol controller subsystem may be connected to a one Gbps or more multi-port switch manager module having a rapid spanning tree protocol (RSTP) block. The multi-port switch management may be connected to the JACE module via one or more of secure and non-secure connections.

The multi-port switch management module may be connected to at least one internet protocol controller of the on-premise networking infrastructure and control subsystem.

The internet protocol controller subsystem may have an input/output (TO) driver connected to an encrypted file subsystem and an open real-time operating system (RTOS) secure boot. The second serial communication manager may be connected to the encrypted file subsystem and the open RTOS secure boot. The open RTOS secure boot may be connected to a polarization-insensitive driver and which is connected to a polarization-insensitive bus for connection to one or more sensor devices and actuator devices. The encrypted file subsystem may be connected to one more drivers. The TO driver may be connected to one or more TO expansion modules and one or more physical TO modules.

U.S. Pat. No. 10,200,203, issued Feb. 5, 2019; U.S. Pat. No. 8,375,402, issued Feb. 12, 2013; U.S. Pat. No. 9,726,392, issued Aug. 8, 2017; U.S. Pat. No. 8,983,632, issued Mar. 17, 2015; U.S. Pat. No. 8,954,543, issued Feb. 10, 2015; U.S. Pat. No. 8,650,306, issued Feb. 11, 2014; U.S. Pat. No. 8,418,128, issued Apr. 9, 2013; U.S. Pat. No. 8,239,500, issued Aug. 7, 2012; U.S. Pat. No. 8,112,162, issued Feb. 7, 2012; U.S. Pat. No. 7,826,929, issued Nov. 2, 2010; U.S. Pat. No. 7,738,972, issued Jun. 15, 2010; and U.S. Pat. No. 7,653,459, issued Jan. 26, 2010; are all hereby incorporated by reference. U.S. patent application Ser. No. 16/436,859, filed Jun. 10, 2019, is hereby incorporated by reference.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:
1. A method for constructing a secure control system, comprising:
connecting an off-premise internet cloud and tool subsystem across an internet boundary with an on-premise networking infrastructure and control subsystem via one or more secure connections;

connecting the on-premise networking infrastructure and control subsystem with an internet protocol controller subsystem via one or more secure connections, wherein the internet protocol controller subsystem includes:
a first board controlled by a first operating system, the first board including:
a multi port switch having a speed of one or more gigabits per second (Gbps);
a web server;
a first encrypted file system;
a first serial communication manager;
a second board controlled by a second operating system, wherein the second operating system includes a Real Time Operating System (RTOS), the second board including:
a second encrypted file system;
a second serial communication manager, wherein the second serial communication manager is in communication with the first serial communication manager of the first board via a communication channel having a speed of one or more gigabits per second (Gbps);
one or more I/O ports; and
one or more input/output (IO) drivers operatively connected to the second encrypted file system for communicating with one or more external devices via the one or more I/O ports.

2. The method of claim 1, wherein:
the communication channel between the first serial communication manager module and the second serial communication manager is encrypted; and
the web server is operatively connected to:
a remote communication virtual private network (VPN) connector of the first board; and
the first serial communication manager module of the first board.

3. The method of claim 2, wherein the remote communication VPN connector is operatively connected to:
the multi port switch; and
a firmware (FW) update service.

4. The method of claim 1, wherein the switch is a four port switch.

5. The method of claim 1, wherein the multi port switch is operatively connected via one or more secure connections to a Java™ application control engine (JACE) module of the on-premise networking infrastructure and control subsystem.

6. The method of claim 5, wherein:
the first board of the internet protocol controller subsystem is operatively connected to a firewall or security or VPN or open module of the on-premise networking infrastructure and control subsystem; and
the firewall or security or VPN or open module of the on-premise networking infrastructure and control subsystem is operatively connected via one or more secure connections to the off-premise internet cloud and tool subsystem across the internet boundary.

7. A control system comprising:
an off-premise internet cloud and tool subsystem, wherein the off-premise internet cloud and the tool subsystem comprises:
a Niagara™ license server connected to a Niagara workbench;
a web browser interface connected to a firewall or security or virtual private network (VPN) or open module;
a remote HVAC user mechanism for operating the web browser interface or the Niagara workbench;
an on-premise networking infrastructure and control subsystem that is operatively coupled to the off-premise internet cloud and tool subsystem via a first secure connection across an internet boundary;
an internet protocol controller subsystem operatively coupled to the on-premise networking infrastructure and control subsystem, wherein the internet protocol controller subsystem includes:
a first card controlled by a first operating system, the first card including:
a multi port switch having a speed of one or more gigabits per second (Gbps);
a web server;
a first encrypted file system;
a first serial communication manager;
a second card controlled by a second operating system, wherein the second operating system includes a Real Time Operating System (RTOS), the second card including:
a second encrypted file system;
a second serial communication manager, wherein the second serial communication manager is in communication with the first serial communication manager of the first card via a communication channel:
one or more I/O ports; and
one or more input/output (IO) drivers operatively connected to the second encrypted file system for communicating with one or more external devices via the one or more I/O ports.

8. The system of claim 7, wherein the one or more external devices includes a heating, ventilation, and air conditioning (HVAC) device.

9. The system of claim 7, wherein the one or more external devices includes a local IO device communication subsystem.

10. The system of claim 7, wherein the one or more external devices includes one or more of an expansion IO device and a physical IO device.

11. The system of claim 7, wherein the on-premise networking infrastructure and control subsystem comprises:
a firewall or security or VPN or open module having a secure connection to a Niagara workbench; and
a wireless encrypted router connected to the firewall or security or VPN or open module and connected to a wireless encrypted dongle, and a BACnet internet protocol (IP) controller connected to the firewall or security or VPN or open module.

12. The system of claim 7, wherein the internal protocol controller subsystem comprises:
a remote communication VPN connector to support the first secure connection.

13. An internet protocol controller subsystem comprising:
a first board controlled by a first operating system, the first board including:
a multi port switch having a speed of one or more gigabits per second (Gbps);
a web server;
a first encrypted file system;
a first serial communication manager;

a second board controlled by a second operating system, wherein the second operating system includes a Real Time Operating System (RTOS), the second board including:
 a second encrypted file system;
 a second serial communication manager, wherein the second serial communication manager is in communication with the first serial communication manager of the first board via a communication channel having a speed of one or more gigabits per second (Gbps);
 one or more I/O ports; and
 one or more input/output (IO) drivers operatively connected to the second encrypted file system for communicating with one or more external devices via the one or more I/O ports.

14. The internet protocol controller subsystem of claim 13, wherein the web server is operatively connected to a remote communication virtual private network (VPN) connector and to the first serial communication manager, and wherein the first serial communication manager is operatively connected to the first encrypted file system and has a secure connection to the second serial communication manager.

15. The internet protocol controller subsystem of claim 14, wherein the remote communication VPN connector is operatively connected to the multi-port switch.

16. The internet protocol controller subsystem of claim 13, wherein the multi-port switch is a four port switch.

17. The internet protocol controller subsystem of claim 13, wherein the one or more external devices comprise a remote heating, ventilation and air conditioning (HVAC) device.

* * * * *